United States Patent
Hayashi et al.

(10) Patent No.: US 9,169,865 B2
(45) Date of Patent: Oct. 27, 2015

(54) THRUST BEARING DEVICE FOR SUPERCHARGER

(71) Applicant: MITSUBISHI HEAVY INDUSTRIES, LTD., Tokyo (JP)

(72) Inventors: Noriyuki Hayashi, Tokyo (JP); Hiroshi Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/348,020

(22) PCT Filed: Dec. 12, 2012

(86) PCT No.: PCT/JP2012/082156
§ 371 (c)(1),
(2) Date: Mar. 27, 2014

(87) PCT Pub. No.: WO2013/099600
PCT Pub. Date: Jul. 4, 2013

(65) Prior Publication Data
US 2014/0233873 A1 Aug. 21, 2014

(30) Foreign Application Priority Data
Dec. 27, 2011 (JP) ................. 2011-285384

(51) Int. Cl.
*F16C 17/04* (2006.01)
*F16C 33/74* (2006.01)
(Continued)

(52) U.S. Cl.
CPC ............ *F16C 17/047* (2013.01); *F01D 25/168* (2013.01); *F02B 39/14* (2013.01); *F02C 6/12* (2013.01); *F16C 33/1075* (2013.01); *F16C 33/1085* (2013.01); *F05D 2220/40* (2013.01)

(58) Field of Classification Search
CPC ........ F16C 17/04; F16C 17/047; F16C 33/02; F16C 33/1055; F16C 33/1075; F16C 2360/24; F16C 2220/40; F02C 6/12; F02B 39/14; F01D 25/186
USPC ................... 384/121, 123, 139, 368
See application file for complete search history.

(56) References Cited

U.S. PATENT DOCUMENTS 3,180,568 A * 4/1965 Oettle ........................ 415/175
3,494,679 A * 2/1970 Burdette ..................... 384/139
(Continued)

FOREIGN PATENT DOCUMENTS

CN 1201105 A 12/1998
CN 202040203 U 11/2011
(Continued)

OTHER PUBLICATIONS

International Preliminary Report on Patentability and Written Opinion of the International Searching Authority (Forms PCT/IB/326, PCT/IB/338, PCT/IB/373 and PCT/ISA/237), dated Jul. 10, 2014, for International Application No. PCT/JP2012/082156, including English translation thereof.
(Continued)

*Primary Examiner* — Marcus Charles
(74) *Attorney, Agent, or Firm* — Birch, Stewart, Kolasch & Birch, LLP (57) ABSTRACT

A thrust bearing device is constituted by a turbine-side thrust collar and a compressor-side thrust collar that are fixed to a rotary shaft; and a thrust bearing that is arranged between the thrust collars. The thrust bearing is provided with an oil passage that supplies lubricating oil r to sliding-contact surfaces formed between the thrust bearing and the thrust collars. The outsides of the thrust collars in a radial direction incline toward the thrust bearing side. A gap c between the sliding-contact surfaces is narrowed as the gap goes outward in the radial direction, and establishes a basic region gap (c1)>an outer peripheral end gap (c2). The lubricating oil outflow resistance of a radial outer region of the gap c becomes larger than that of a radial inner region. Therefore, the lubricating oil r can be kept from flowing out from a radial outer outlet.

7 Claims, 8 Drawing Sheets

(51) Int. Cl.
  *F02B 39/14*  (2006.01)
  *F16C 33/10*  (2006.01)
  *F01D 25/16*  (2006.01)
  *F02C 6/12*  (2006.01)

(56) References Cited

U.S. PATENT DOCUMENTS

| | | | | |
|---|---|---|---|---|
| 4,157,834 | A * | 6/1979 | Burdette | 415/175 |
| 4,171,137 | A * | 10/1979 | Aizu et al. | 415/111 |
| 4,389,052 | A * | 6/1983 | Shimizu et al. | 415/111 |
| 4,453,837 | A * | 6/1984 | Shimizu et al. | 384/121 |
| 4,986,733 | A * | 1/1991 | Fleury et al. | 417/407 |
| 5,176,497 | A * | 1/1993 | Deacon et al. | 417/407 |
| 5,967,762 | A * | 10/1999 | Keller et al. | 417/407 |
| 6,418,722 | B1 * | 7/2002 | Arnold | 417/407 |
| 2002/0141862 | A1 * | 10/2002 | McEwen | 415/111 |
| 2010/0232959 | A1 * | 9/2010 | Takei et al. | 29/898.06 |

FOREIGN PATENT DOCUMENTS

| | | | | |
|---|---|---|---|---|
| GB | 2463453 A * | 3/2010 | | F01D 5/02 |
| JP | 2-14825 U | 1/1990 | | |
| JP | 5-75519 U | 10/1993 | | |
| JP | 9-25928 A | 1/1997 | | |
| JP | 2002-206522 A | 7/2002 | | |
| JP | 2002-349551 A | 12/2002 | | |
| JP | 2003-232339 A | 8/2003 | | |
| JP | 2006-183702 A | 7/2006 | | |
| JP | 2008031949 A * | 2/2008 | | F02B 39/14 |
| JP | 2009-197772 A | 9/2009 | | |
| JP | 2011-12570 A | 1/2011 | | |
| WO | WO 0169047 A1 * | 9/2001 | | F16C 27/04 |

OTHER PUBLICATIONS

International Search Report and Written Opinion of the International Searching Authority (Forms PCT/ISA/210, PCT/ISA/220 and PCT/ISA/237), dated Feb. 12, 2013, for International Application No. PCT/JP2012/082156, including English translation of International Search Report.

Japanese Notice of Allowance, dated Mar. 11, 2014, for Japanese Application No. 2013-551587, including English translation thereof.

Office Action issued in the corresponding Chinese Application No. 201280047183.1 on Jul. 24, 2015 with an English translation.

* cited by examiner

III-III CROSS-SECTION

FIG. 4

IV-IV CROSS-SECTION

I-I CROSS-SECTION

FIG. 10

II-II CROSS-SECTION

THRUST BEARING DEVICE FOR SUPERCHARGER

TECHNICAL FIELD

The present invention relates to a thrust bearing device for a supercharger adapted to keep lubricating oil supplied to a thrust bearing from flowing out to an outer peripheral side due to a centrifugal force generated by rotation of a rotary shaft.

BACKGROUND ART

In superchargers, a thrust force is generated in a rotary shaft due to a pressure difference on a compressor side and a turbine side. Therefore, a thrust bearing is provided to stop the movement of the rotary shaft in a thrust direction. As the thrust bearing, bearings with simple structure, such as a taper-land type thrust bearing, are often used. However, when the rotating speed of the rotary shaft is fast, a centrifugal force acts on lubricating oil outward in the radial direction of the rotary shaft. Therefore, the outflow of the lubricating oil to an outer peripheral side increases.

A thrust bearing is arranged to face the rotary shaft of a supercharger, and thrust collars that apply a thrust force to the thrust bearing are fixed to the rotary shaft. Since it is generally difficult to make the thrust collars parallel to the thrust bearing without an error, a gap may be increased in outer peripheral regions of facing surfaces between the thrust bearing and the thrust collars. When the rotating speed of the rotary shaft is fast and a large centrifugal force acts on the lubricating oil, if there is an increased gap on outer peripheral sides of the facing surface, there is a concern that a large amount of lubricating oil may flow out from this gap, and the bearing capability of the thrust bearing may decline extremely.

A thrust bearing device for an exhaust gas turbo supercharger is disclosed in PTL 1. This thrust bearing device includes a turbine wheel and a compressor wheel that are fixed to a rotary shaft, a turbine-side thrust collar and a compressor-side thrust collar that are fixed to the rotary shaft, and a thrust bearing that is fixed to a bearing housing, has the two thrust collars coming into sliding contact therewith from both sides, and receives a thrust load applied to the rotary shaft.

A taper-land type thrust bearing provided in fluid machinery, such as a water wheel and a pump, is disclosed in PTL 2. PTL 2 suggests the thrust bearing that promotes formation of a lubricating oil film and increases the load bearing capability of a thrust bearing. This taper-land type thrust bearing is constituted by an inclined surface having a deepest portion provided continuously with a groove, and a horizontal surface provided continuously with a rising gradient termination end of the inclined surface. A boundary line between the inclined surface and the horizontal surface inclines with respect to a radial direction. That is, the outflow direction of the lubricating oil is the direction of a resultant force of a rotating speed vector of the thrust collars rotating with the rotary shaft, and a velocity vector of a centrifugal force generated in the lubricating oil by the rotation. In PTL 2, the boundary line inclines so that a radial outer region is directed to a direction reverse to a rotational direction, to suppress outflow of the lubricating oil.

Figure 8:
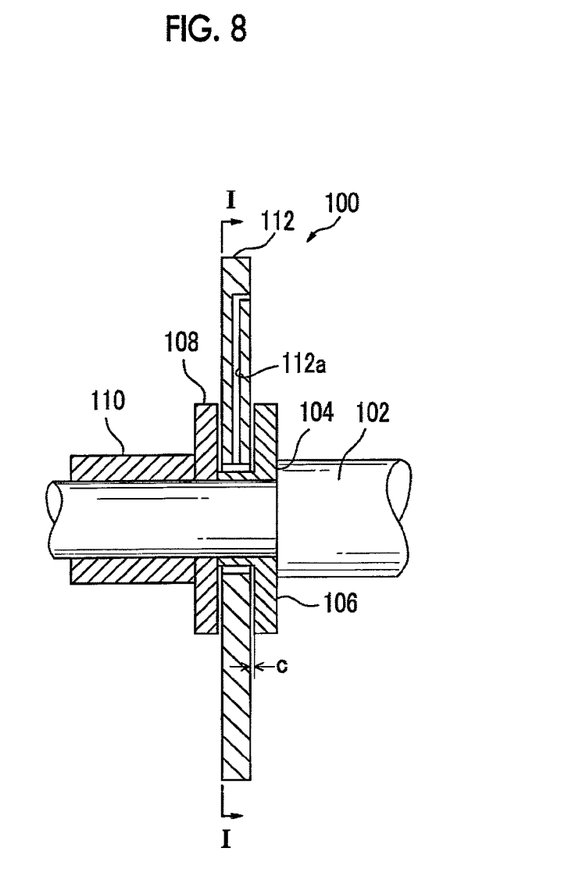
FIG. 8 is a cross-sectional view of a thrust bearing device as intermediate technology conceived before the present inventors has reached the invention.
Figure 9:
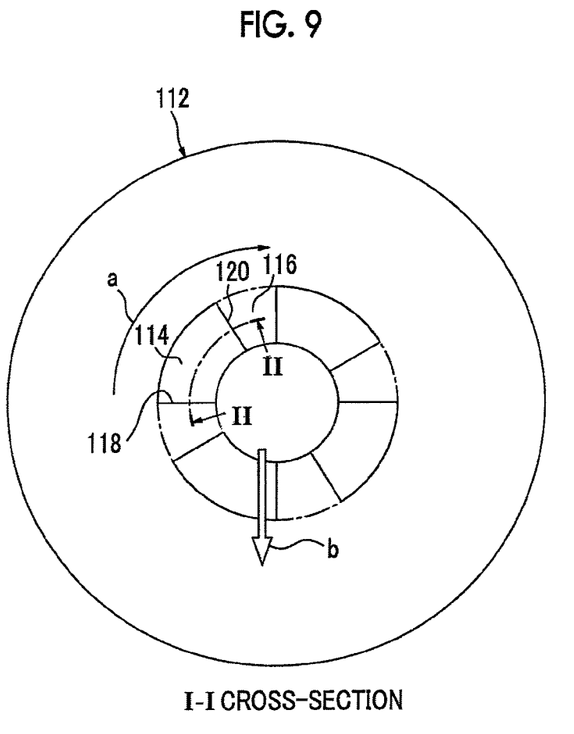
FIG. 9 is a cross-sectional view taken along line I-I in FIG. 8.
Figure 10:
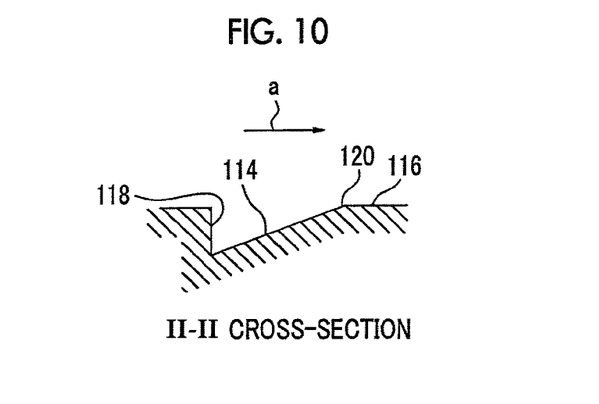
FIG. 10 is a cross-sectional view taken along line II-II in FIG. 8.

A thrust bearing device for a supercharger as intermediate technology (not well-known) conceived before the present inventors has reached the invention is shown in FIGS. 8 to 10. In the drawings, in a thrust bearing device 100, a turbine-side thrust collar 106 is made to extend in an axis-orthogonal direction (radial direction), and is locked to a step 104 formed at the rotary shaft 102. A compressor-side thrust collar 108 is made to confront the turbine-side thrust collar 106, and is fixed to the rotary shaft 102 with a hold-down member 110 fitted to the rotary shaft 102. A thrust bearing 112 made to extend in the axis-orthogonal direction (radial direction) with a larger diameter than the thrust collars 106 and 108 is interposed between the two thrust collars 106 and 108. The two thrust collars 106 and 108 rotate in the direction of arrow a together with the rotary shaft 102, and the thrust bearing 112 is fixed to a bearing housing (not shown). A thrust force applied to the rotary shaft 102 is received by the thrust bearing 112 via the two thrust collars 106 and 108, and thereby stops the movement of the rotary shaft 102 in a thrust direction.

A thrust bearing 112 is provided with an oil passage 112a that supplies lubricating oil r to sliding-contact surfaces that come into sliding contact with the two thrust collars 106 and 108. As shown in FIG. 10, the thrust bearing 112 is formed with a taper surface 114 including an inclined plane forming a rising gradient toward a downstream side in a rotational direction a of the rotary shaft 102, and a land surface 116 that is provided continuously with a rising gradient termination end of the taper surface 114 and forms the same plane as an outer peripheral plane of the thrust bearing 112. As shown in FIG. 9, a step 118 and a boundary line 120 that are formed between the taper surface 114 and the land surface 116 are directed to the radial direction. A centrifugal force b acts outward in the radial direction due to the rotation of the rotary shaft 12.

In this configuration, if a gap c in the axis-orthogonal direction (radial direction) on an outer peripheral side between the thrust collar 106 or 108 and the thrust bearing 112 is increased due to a manufacturing error or the like, a larger amount of lubricating oil flows out from the gap c when a large centrifugal force acts on the lubricating oil r. Accordingly, there is a concern that an oil film pressure between the thrust collar and the thrust bearing may deteriorate, and the load capability of the thrust bearing may decline extremely.

SUMMARY OF INVENTION

Technical Problem

[PTL 1]: Japanese Unexamined Patent Application Publication No. 2009-197772

[PTL 2]: Japanese Unexamined Patent Application Publication No. 2006-183702

SUMMARY OF INVENTION

Technical Problem

Since the rotary shaft of the supercharger rotates at a high speed that reaches, for example, 200,000 rpm, a large centrifugal force acts on the lubricating oil. Therefore, as disclosed in PTL 2, even if there is provided means in which the boundary line between the inclined surface and the horizontal surface is inclined so that the radial outer region is directed to the direction reverse to the rotational direction, it is difficult to sufficiently suppress the outflow of the lubricating oil from the thrust bearing.

The invention has been made in view of this problem, and an object of the invention is to keep lubricating oil from flowing out from a thrust bearing due to a centrifugal force created by the rotation of supercharger and maintain the load bearing capability of the thrust bearing high, using simple and low-cost means.

Solution to Problem

To achieve this object, a thrust bearing device for a supercharger of the invention includes a turbine wheel and a compressor wheel that are fixed to a rotary shaft; a turbine-side thrust collar and a compressor-side thrust collar that are fixed to the rotary shaft; a thrust bearing that is fixed to a bearing housing, has the two thrust collars coming into sliding contact therewith from both sides in a thrust direction, and receives a thrust load applied to the rotary shaft. An oil passage is formed in the two thrust collars or the thrust bearing so that lubricating oil is supplied between sliding-contact surfaces in a radial direction, which is an axis-orthogonal direction, formed between the two thrust collars and the thrust bearing and a gap forms a lubricating oil film between the sliding-contact surfaces in the radial direction, which is the axis-orthogonal direction. The gap where the lubricating oil film is formed is formed so that the lubricating oil outflow resistance of a radial outer region becomes larger than that of a radial inner region.

The invention adopts the above configuration in the sliding-contact surfaces formed in the two thrust collars and the thrust bearing. Accordingly, the outflow of the lubricating oil that flows in an outer peripheral direction due to the action of the centrifugal force can be suppressed in the gap formed in the sliding-contact surfaces. Therefore, since the oil film pressure between the sliding-contact surfaces can be made high, the load bearing capability of the thrust bearing can be improved. Accordingly, a risk that the thrust collars and the thrust bearings are brought into contact with each other and become damaged may be reduced. Additionally, since the load bearing capability of the thrust bearing is improved, the thrust bearing can be made as small as that, and the power loss of the supercharger created by the friction between the thrust collars and the thrust bearing can be reduced.

In the invention, the thrust bearing device for a supercharger may further include an oil film pressure formation structure in which an inclined surface, which is provided on one surface constituting the sliding-contact surfaces to form a storage space for the lubricating oil, and forms a rising gradient in a circumferential direction of the rotary shaft, and a plane, which is provided continuously with a rising gradient termination end of the inclined surface and is parallel to a facing surface, are alternately arranged in the circumferential direction of the rotary shaft. In this oil film pressure formation structure, the lubricating oil supplied between sliding-contact surfaces from the oil passage enters the inclined surface to form an oil film. The lubricating oil is entrained in the rotational direction of the rotary shaft, enters the rising gradient of the inclined surface to gradually raise the oil film pressure, and has a maximum pressure in the parallel plane provided continuously with the rising gradient termination end. Therefore, the oil film pressure of the sliding-contact surfaces can be kept high.

In addition, when the oil film pressure formation structure is formed in the thrust bearing, the rising gradient of the inclined surface is formed toward the downstream side in the rotational direction. Additionally, when the oil film pressure formation structure is formed in the two thrust collars, the rising gradient of the inclined surface is formed toward the upstream side in the rotational direction.

In the invention, at least one surface constituting the sliding-contact surfaces may be inclinedly configured so as to approach a facing surface as the sliding-contact surface goes outward in the radial direction, and the gap between the sliding-contact surfaces decreases gradually outward in the radial direction. By narrowing the radial outer outlet of the gap between the sliding-contact surfaces in this way, the lubricating oil outflow resistance of the radial outer region of the gap becomes larger than that of the radial inner region. Therefore, the outflow of the lubricating oil from the gap can be suppressed, and the oil film pressure of the gap can be kept high. Additionally, an oil output suppression structure can be simply manufactured at low cost.

In addition to the above structure, a land portion having parallel facing surfaces that maintain the gap between the sliding-contact surfaces brought closest to each other at an inclined region throughout the radial direction may be formed outside a region that is arranged in an inclined manner. By forming this land portion, as mentioned above, the oil film pressure can be raised to the maximum.

In the invention, steps may be formed at radial outer regions of the sliding-contact surfaces between the thrust bearing and the thrust collars, and the gap formed between the sliding-contact surfaces may have the structure of being curved at the steps. A curved portion can be formed in the radial outer region on the lubricating oil film formed between the sliding-contact surfaces by the steps. Accordingly, the lubricating oil outflow resistance of the radial outer region of the gap becomes larger than that of the radial inner region. Therefore, the lubricating oil that flows out in the outer peripheral direction due to the centrifugal force can be suppressed, and the oil film pressure between the sliding-contact surfaces can be kept high. Additionally, simple and low-cost processing that only forms the steps in the sliding-contact surfaces is needed.

In the invention, regions of the thrust bearing that protrude further outward in the radial direction than the two thrust collars may be formed to be thicker than inner regions of the thrust bearing, steps may be formed at boundaries between the protruding regions and the inner regions on both surfaces of the thrust bearing, and the steps may be arranged so as to cover at least portions of outer peripheral end surfaces of the two thrust collars. Due to the steps, the lubricating oil outflow resistance of the radial outer region of the gap becomes larger than that of the radial inner region. Therefore, outflow of the lubricating oil that flows in the outer peripheral direction due to the centrifugal force can be suppressed, and the oil film pressure between the sliding-contact surfaces can be kept high. In this configuration, since the step may be simply provided only in the thrust bearing, simple and low-cost processing is needed.

Advantageous Effects of Invention

According to the invention, since there is provided the configuration in which the lubricating oil outflow resistance of the radial outer region of the gap formed between the sliding-contact surfaces formed by the two thrust collars and the thrust bearing becomes larger that that of the radial inner region, the lubricating oil that flows out in the outer peripheral direction from the gap due to the centrifugal force can be suppressed, and the oil film pressure between the sliding-contact surfaces can be kept high. Accordingly, since the load bearing capability of the thrust bearing is improved, the thrust bearing can be made small as much, and the power loss of the supercharger created by the friction between the thrust collars and the thrust bearing can be reduced.

DESCRIPTION OF EMBODIMENTS

Hereinafter, the invention will be described in detail with the reference to the embodiments shown in the drawings. However, unless otherwise specified, the dimensions, materials, shapes, relative arrangements, or the like of component parts described in the embodiments, are not intended to limit the scope of the invention.

Embodiment 1

Figure 1:
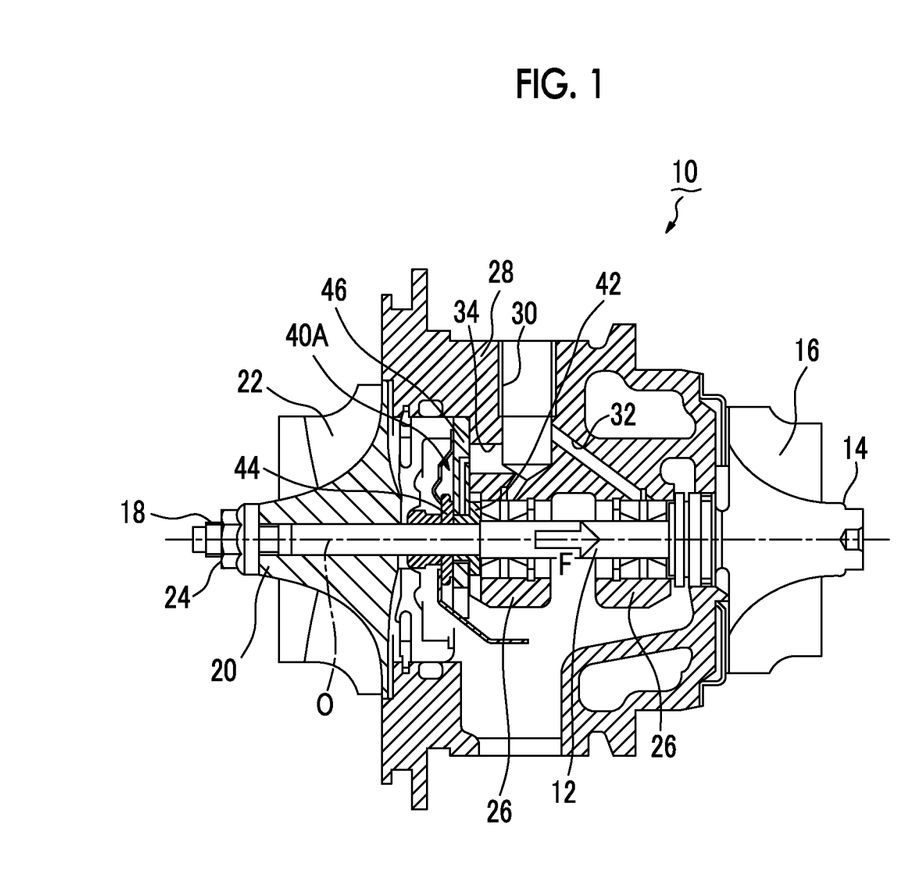
FIG. 1 is a cross-sectional view in a front view of an exhaust gas turbo supercharger related to a first embodiment of the invention.

A first embodiment to which the invention is applied to an exhaust gas turbo supercharger will be described with reference to FIGS. 1 to 4. FIG. 1 is a cross-sectional view of an overall exhaust gas turbo supercharger 10 incorporating a thrust bearing device of the present embodiment. In addition, illustrations of a turbine housing and a compressor housing are omitted in FIG. 1. In FIG. 1, a rotary shaft 12 is arranged along a central axis O, and a turbine wheel 14 from which a plurality of turbine rotor blades 16 are provided to protrude in a radial direction is anchored to a shaft end of the rotary shaft 12. The other end of the rotary shaft 12 is provided with a threaded portion 18, a compressor wheel 20 is fitted and inserted from the threaded portion 18, and the compressor wheel 20 is fixed to the threaded portion 18 with a nut 24. The compressor wheel 20 has a plurality of compressor blades 22 provided to protrude in a radial direction therefrom.

The rotary shaft 12 is borne in a bearing housing 28 by journal bearings 26 and 26 in two places of a middle portion sandwiched by the compressor wheel 20 and the turbine wheel 14. The turbine rotor blades 16 rotate with exhaust gas that flows in from the turbine housing (not shown), and the turbine wheel 14, the rotary shaft 12, and the compressor wheel 20 rotate around the central axis O of the supercharger. In the exhaust gas turbo supercharger 10, a thrust load F that is a difference between an axial force of the turbine wheel 14 and an axial force of the compressor wheel 20 acts on the rotary shaft 12 to the right (the direction of the turbine wheel 14) of the drawing. In addition, the action direction of the thrust load F may be one that acts in a direction opposite to the arrow of FIG. 1 depending on the magnitude of the inlet pressure of the turbine wheel 14 and the outlet pressure of a compressor wheel 20.

A turbine-side thrust collar 42B and a compressor-side thrust collar 44B are fixed to the rotary shaft 12, and a thrust bearing 46 is arranged between the two thrust collars. The thrust bearing 46 is fixed to the bearing housing 28 on an outer peripheral side thereof. The thrust load F that acts on the rotary shaft 12 is received by the thrust bearing 46 via the thrust collar 42B or 44B, and stops the movement of the rotary shaft 12 in a thrust direction. A thrust bearing device 40A is constituted by these members. The bearing housing 28 is provided with oil passages 30, 32, and 34 for supplying lubricating oil to the journal bearings 26 and 26 and the thrust bearing device 40A.

Figure 2:
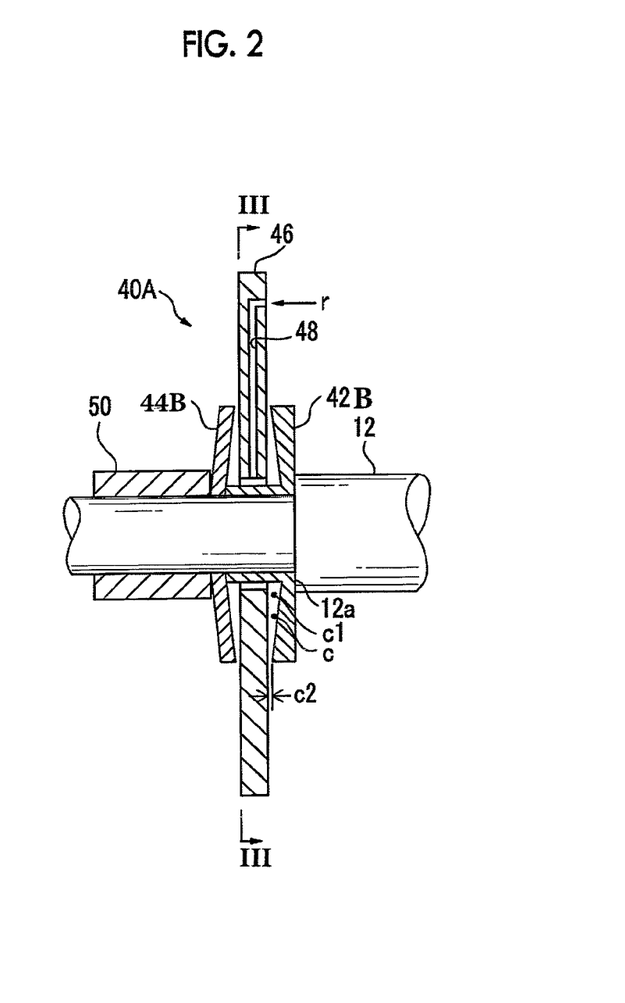
FIG. 2 is a partially enlarged cross-sectional view showing a thrust bearing device of FIG. 1.

FIG. 2 is an enlarged cross-sectional view of the thrust bearing device 40A. In FIG. 2, the thrust bearing 46 has a disk shape, and an oil passage 48 communicating with the oil passage 34 provided in the bearing housing 28 is bored in the thrust bearing in an axis-orthogonal direction (radial direction) or slightly obliquely with respect to the axis-orthogonal direction. The turbine-side thrust collar 42B has an L-shaped cross-section, has a round shape at an outer periphery thereof, and is locked to a step 12a formed at the rotary shaft 12. The compressor-side thrust collar 44B has a disk shape, and is fixed to the rotary shaft 12 by a cylindrical hold-down member 50.

The facing surfaces of the two thrust collars 42B and 44B that face the thrust bearing 46 incline toward the thrust bearing 46 side so that a gap c between each facing surface and a radially formed sliding-contact surface on an outer peripheral surface side of the thrust bearing 46 becomes narrow gradually toward an outer peripheral side. That is, the size of the gap c becomes basic region gap c1>outer peripheral end gap c2. In addition, in FIG. 2, the gap c is shown more exaggeratedly than an actual size (this is also the same in FIGS. 5 to 7 to be described below).

Figure 4:
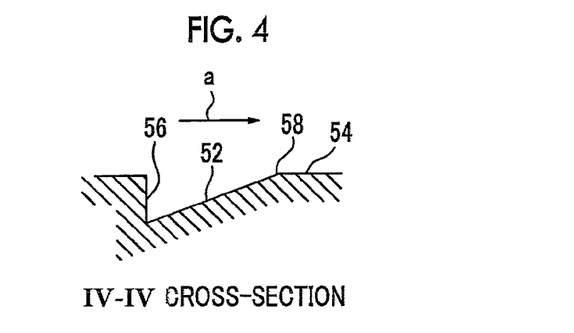
FIG. 4 is a cross-sectional view taken along line Iv-Iv in FIG. 3.

As shown in FIG. 4, the thrust bearing 46 is formed with a taper surface 52 including an inclined plane having a rising gradient along a downstream side in a rotational direction a of the rotary shaft 12, and a land surface 54 that is provided continuously with a rising gradient termination end of the taper surface 52, forms the same plane as an outer peripheral plane 60 of the thrust bearing 46, and is parallel to the facing surface of the compressor-side thrust collar 44.

Figure 3:
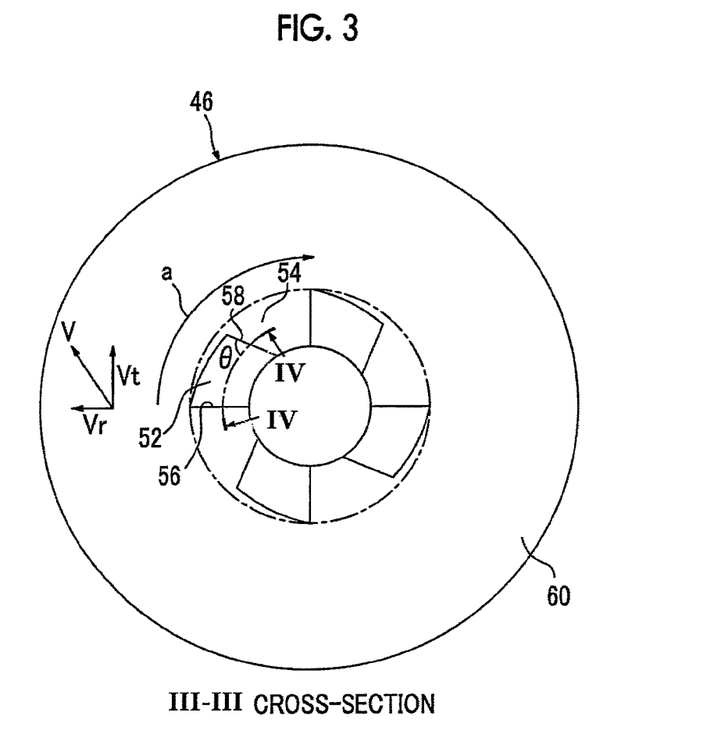
FIG. 3 is a cross-sectional view taken along line III-III in FIG. 2.

As shown in FIG. 3, a step 56 and a boundary line 58 that are formed between the taper surface 52 and the land surface 54 incline with respect to the radial direction. The step 56 and the boundary line 58 are directed to a direction that goes backward with respect to the rotational direction a as they go outward. That is, as shown in FIG. 3, the boundary line 58 is directed to a direction in which the angle θ between the boundary line and the circumferential direction of a circle concentric with the central axis becomes an acute angle. This shape formed on the surface of the thrust bearing 46 that faces the compressor-side thrust collar 44 is also formed on the surface of the thrust bearing that faces the turbine-side thrust collar 42B.

According to the present embodiment, lubricating oil r is supplied from the oil passage 48 to the gap c between the thrust collar 42B, 44B and the thrust bearing 46. Since the gap c is configured so as to become narrow gradually outward in the radial direction, the lubricating oil outflow resistance of a radial outer region of the gap c becomes larger than that of a radial inner region. Therefore, even if the centrifugal force acts on the lubricating oil r due to the rotation of the thrust collars 42B and 44B, the lubricating oil r can be kept from flowing out to the outer peripheral side from the gap c. Therefore, since the oil film pressure of the lubricating oil r in the gap c is kept high, the load bearing capability of the thrust bearing 46 is improved. Accordingly, it is possible to reduce a risk that the thrust collars 42B and 44B and the thrust bearing 46 may be brought into contact with each other and be damaged, and the size of the thrust bearing device 40A can be made small as much as the load bearing capability is improved.

Additionally, since the thrust collars 42B and 44B rotate together with the rotary shaft 12, boundary layers of the lubricating oil r formed on the surfaces of the thrust collars 42B and 44B also rotate together. The velocity vector of the boundary layers is defined as Vt. The boundary layers receive a centrifugal force created by rotation, and a velocity vector Vr in a direction perpendicular to the rotational direction a is created. Therefore, the boundary layers flow at a velocity vector V outward from a tangential direction of the rotary shaft 12. In the present embodiment, since the boundary line 58 is directed to the direction in which the angle θ between the boundary line and the circumferential direction of the circle concentric with the central axis becomes an acute angle, the lubricating oil r can be kept from flowing out in the radial direction from an outer peripheral outlet of the gap c.

In addition, in the present embodiment, the outer peripheral sides of the thrust collars 42B and 44B are inclined toward the thrust bearing 46 side. Instead of this, however, both sides of the thrust bearing 46 may be inclined to the thrust collars 42B and 44B side on the outer peripheral sides thereof. Additionally, oil film pressure formation structures including the inclined surface 52 and the land surface 54 that are formed in the thrust bearing 46 may be formed on the surfaces of the thrust collars 42B and 44B that come into sliding contact with the thrust bearing 46.

Embodiment 2

Figure 5:
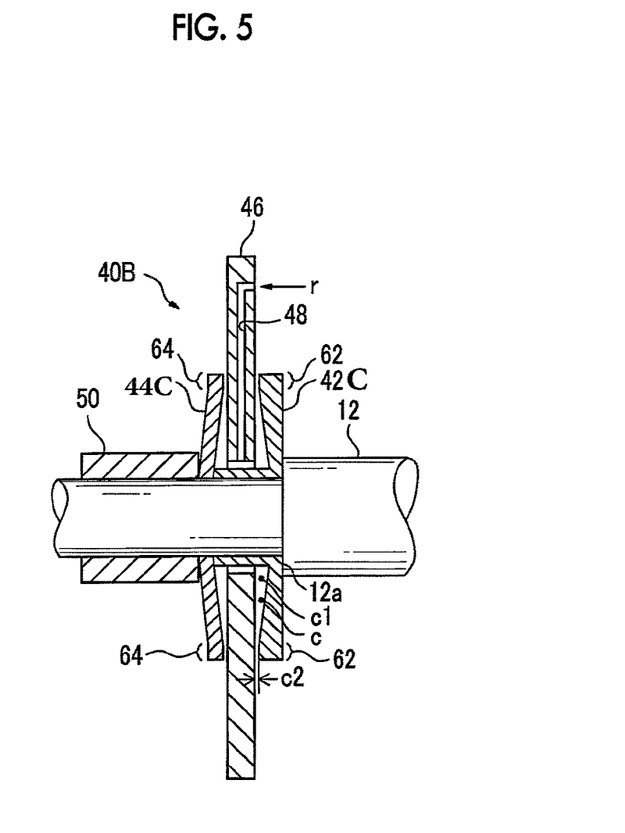
FIG. 5 is a cross-sectional view of a thrust bearing device related to a second embodiment of the invention.

Next, a second embodiment to which the invention is applied to the exhaust gas turbo supercharger will be described with reference to FIG. 5. In FIG. 5, a thrust bearing device 40B of the present embodiment has the same configuration as that of the first embodiment except for the configuration to be described below. That is, in the thrust collars 42C and 44C, land portions 62 and 64 that form planes parallel to the surfaces of the thrust bearing 46 are formed on outer peripheral sides of the inclined portions that have inclined surfaces with respect to outer peripheral surfaces (radial surfaces) of the thrust bearing 46. Each inclined portion has a minimum gap c2 with the thrust bearing 46 at an outer peripheral outlet, and the land portions 62 and 64 maintain the minimum gap c2 in the radial direction.

In the present embodiment, since the thrust collars 42C and 44C have land portions 62 and 64, oil film pressure can be made high to the maximum at the land portions 62 and 64. Therefore, the outflow suppressing effect of the lubricating oil r can be further enhanced, and the load bearing capability of the lubricating oil r can be further improved compared to the first embodiment.

Embodiment 3

Figure 6:
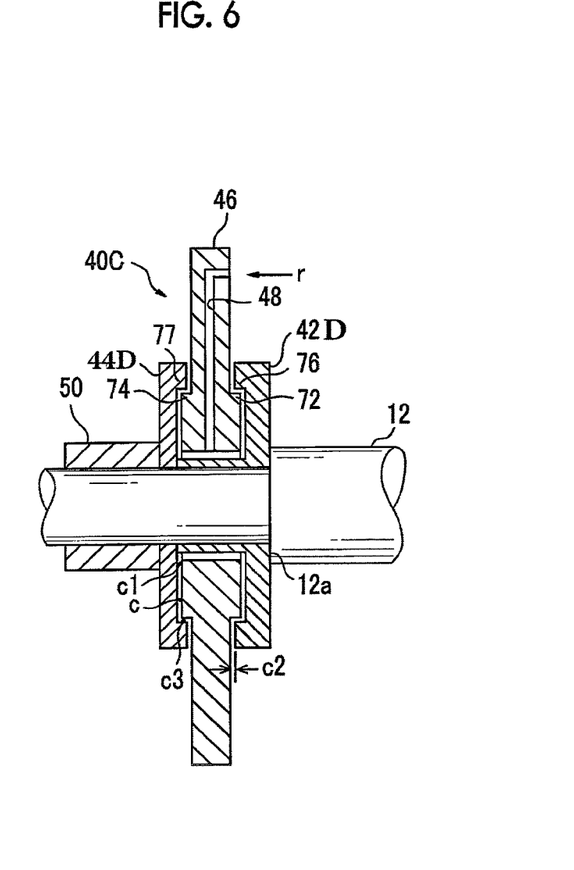
FIG. 6 is a cross-sectional view of a thrust bearing device related to a third embodiment of the invention.

Next, a third embodiment of the invention will be described with reference to FIG. 6. In a thrust bearing device 40C of the present embodiment, the thrust bearing 46 and the thrust collars 42D and 44D do not have inclined surfaces unlike the first embodiment or the second embodiment, and are arranged in the direction perpendicular to the rotary shaft 12. Additionally, gap regions between the outer peripheral surfaces (radial surfaces) of the thrust bearing 46 and the radial sliding-contact surfaces of the thrust collars 42D and 44D form steps that are directed to the axis direction of the rotary shaft 12 at radial outer regions. In the present embodiment, the size of a gap c becomes basic region gap c1=stepped portion gap c3=outer peripheral end gap c2. That is, the thrust bearing 46 is formed to be thicker at an inner region than at an outer region, forms steps 72 and 74 on both outer peripheral surfaces at an outer peripheral middle position, and is formed to be narrow on an outer peripheral tip side. Meanwhile, the thrust collars 42D and 44D are formed so that outer regions of the confronting surfaces thereof that confront the thrust bearing 46 are thicker than inner regions thereof, and steps 76 and 78 are formed at positions corresponding to the steps 72 and 74.

In the present embodiment, in the sliding-contact surfaces between the thrust bearing 46 and the thrust collars 42D and 44D, the gap c between the sliding-contact surfaces is curved due to the presence of the step that is provided at an outer peripheral region of the sliding-contact surface and is directed to the thrust bearing 46 along the axis direction of the rotary shaft 12. Therefore, the lubricating oil outflow resistance of the stepped portion gap c3 becomes larger than that of the basic region gap c1. Therefore, the lubricating oil r can be kept from flowing out from the outer peripheral outlets. Therefore, the oil film pressure of the lubricating oil r in the gap c can be made high, and the load bearing capability of the lubricating oil r can be improved.

Embodiment 4

Figure 7:
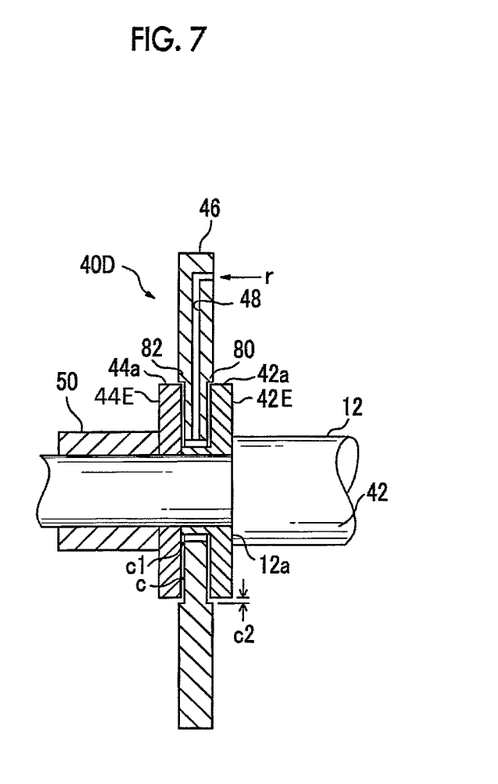
FIG. 7 is a cross-sectional view of a thrust bearing device related to a fourth embodiment of the invention.

Next, a fourth embodiment of the invention will be described with reference to FIG. 7. In a thrust bearing device 40D of the present embodiment, regions of the thrust bearing 46 that protrude further outward in the radial direction than the thrust collars 42E and 44E are formed to be thicker than inner regions of the thrust bearing that are confronting surfaces that confront the thrust collars 42E and 44E, and steps 80 and 82 are formed at boundaries of the protruding regions and the inner regions on both surfaces of the thrust bearing 46. The step 80 or 82 is arranged so as to cover one corner portion of an outer peripheral end surface 42a or 44a of the thrust collar 42E or 44E. Accordingly, a gap c is curved at right angles at an outer peripheral end of the thrust collar 42E or 44E along the outer peripheral end surface 42a or 44a of the thrust collar 42E or 44E. The size of the gap c is basic region (circumferential direction on a shaft base side) gap c1=outer peripheral end (step portion) gap c2.

According to the present embodiment, the lubricating oil outflow resistance of the outer peripheral end gap c2 becomes larger than the basic region gap c1 by forming the curved portion (step portion) at the gap c at the outer peripheral end of the thrust collar 42E or 44E that confronts the thrust bearing 46. Therefore, the lubricating oil r can be kept from flowing out from an outlet of the gap c. Therefore, the oil film pressure of the lubricating oil r in the gap c can be made high, and the load bearing capability of the lubricating oil r can be improved.

In addition, in the invention, the configuration of the third embodiment or the fourth embodiment may be combined with the configuration of the first embodiment or the second embodiment.

INDUSTRIAL APPLICABILITY

According to the invention, in the thrust bearing device for a supercharger, simple and low-cost means can control lubricating oil from flowing out from the gap c between the sliding-contact surfaces in the axis-orthogonal direction (radial direction) formed between the thrust bearing and the thrust collar to the outer peripheral side due to the action of the centrifugal force, and can improve the load bearing capability.

The invention claimed is:
1. A thrust bearing device for a supercharger comprising:
a turbine wheel and a compressor wheel that are fixed to a rotary shaft;

a turbine-side thrust collar and a compressor-side thrust collar that are fixed to the rotary shaft and each having a sliding-contact surface;

a thrust bearing that is fixed to a bearing housing, has the two thrust collars coming into sliding contact with sliding-contact surfaces at both sides of the thrust bearing in a thrust direction, and receives a thrust load applied to the rotary shaft, an oil passage that is formed in the two thrust collars or the thrust bearing so that lubricating oil is supplied between respective said sliding-contact surfaces in a radial direction, which is an axis-orthogonal direction, formed between the sliding-contact surfaces of the two thrust collars and the sliding-contact surfaces of the thrust bearing; and a gap that forms a lubricating oil film between the respective sliding-contact surfaces in the radial direction, which is the axis-orthogonal direction, wherein the gap where the lubricating oil film is formed is formed so that the lubricating oil outflow resistance of a radial outer region becomes larger than that of a radial inner region, and wherein at least one surface among the sliding-contact surfaces is configured as an incline so as to approach a facing surface as the inclined surface goes outward in the radial direction, and the gap between the sliding-contact surfaces decreases gradually outward in the radial direction.

2. The thrust bearing device for a supercharger according to claim 1, further comprising:

an oil film pressure formation structure in which the inclined surface, which is provided on one surface among the sliding-contact surfaces to form a storage space for the lubricating oil, and which forms a rising gradient in a circumferential direction of the rotary shaft, and a plane, which is provided continuously with a rising gradient termination end of the inclined surface and is parallel to a facing surface, are alternately arranged in the circumferential direction of the rotary shaft.

3. The thrust bearing device for a supercharger according to claim 1, wherein a land portion having parallel facing surfaces that maintain the gap between the sliding-contact surfaces brought closest to each other at an inclined region throughout the radial direction is formed outside a region in which the inclined surface is formed.

4. The thrust bearing device for a supercharger according to claim 1, wherein steps are formed at radial outer regions of the sliding-contact surfaces, and the gap formed between the sliding-contact surfaces is curved due to a step-structure.

5. The thrust bearing device for a supercharger according to claim 4, wherein regions of the thrust bearing that protrude further outward in the radial direction than the two thrust collars are formed to be thicker than inner regions of the thrust bearing, steps are formed at boundaries between the protruding regions and the inner regions on both surfaces of the thrust bearing, and the steps are arranged so as to cover at least portions of outer peripheral end surfaces of the two thrust collars.

6. A thrust bearing device for a supercharger comprising:

a turbine wheel and a compressor wheel that are fixed to a rotary shaft;

a turbine-side thrust collar and a compressor-side thrust collar that are fixed to the rotary shaft and each having a sliding-contact surface;

a thrust bearing that is fixed to a bearing housing, has the two thrust collars coming into sliding contact with sliding-contact surfaces at both sides of the thrust bearing in a thrust direction, and receives a thrust load applied to the rotary shaft, an oil passage that is formed in the two thrust collars or the thrust bearing so that lubricating oil is supplied between respective said sliding-contact surfaces in a radial direction, which is an axis-orthogonal direction, formed between the sliding-contact surfaces of the two thrust collars and the sliding-contact surfaces of the thrust bearing; and a gap that forms a lubricating oil film between the respective sliding-contact surfaces in the radial direction, which is the axis-orthogonal direction, wherein, in order to make the lubricating oil outflow resistance of the radial outer regions in the gap where the lubricating oil film is formed become larger than that of the radial inner regions, steps are formed on both outer peripheral surfaces of the thrust bearing and radial inner regions are formed to have a larger thickness than radial outer regions with the steps as boundaries, radial outer regions of confronting surfaces of the two thrust collars that confront the radial outer regions of the thrust bearing are formed to have a larger thickness than the radial inner regions of the confronting surfaces of the two thrust collars that confront the radial inner regions of the thrust bearing, and the gap formed between the sliding-contact surfaces forms a curved structure due to the steps.

7. The thrust bearing device for a supercharger according to claim 2, wherein steps are formed at radial outer regions of the sliding-contact surfaces, and the gap formed between the sliding-contact surfaces is curved due to the steps.

* * * * *